Nov. 30, 1954     F. M. FORD     2,695,790
VERTICAL ADJUSTING MEANS FOR MOWING MACHINES
Filed Dec. 15, 1952
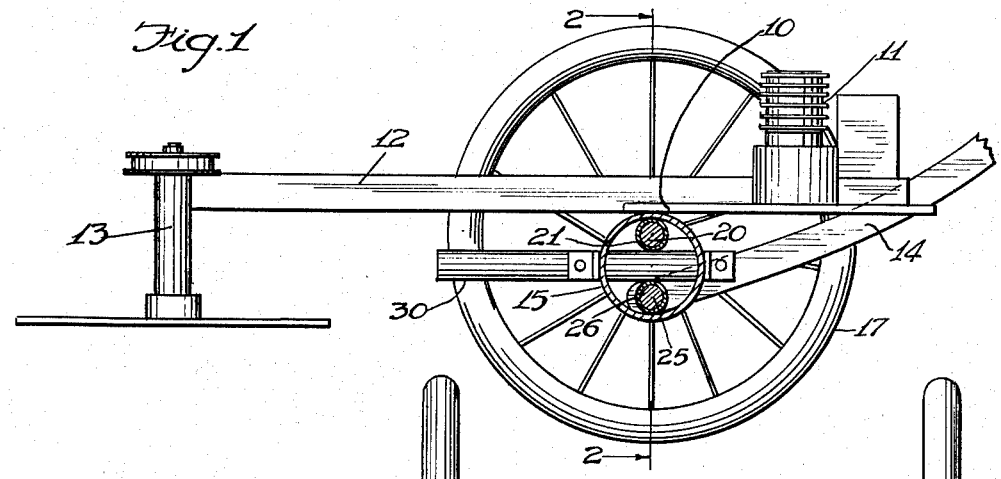
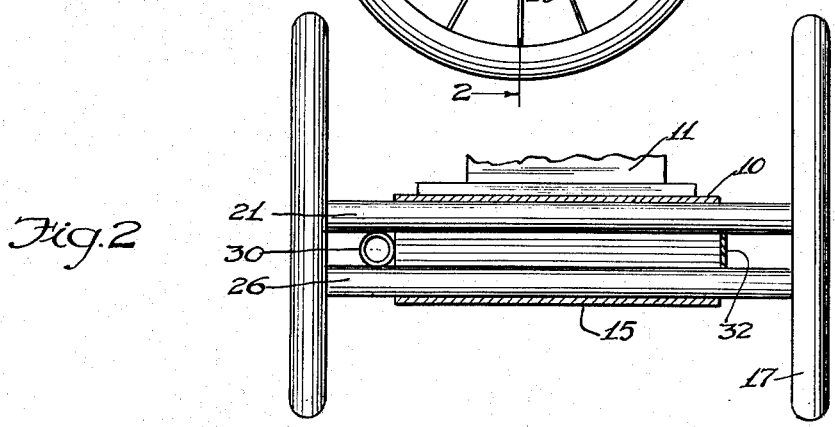
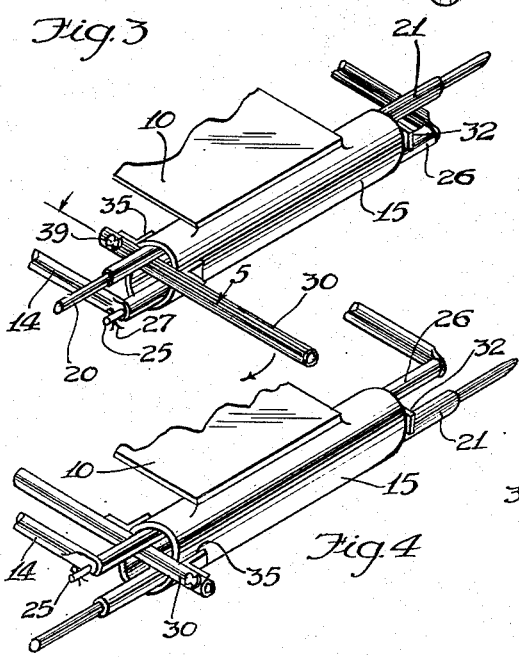
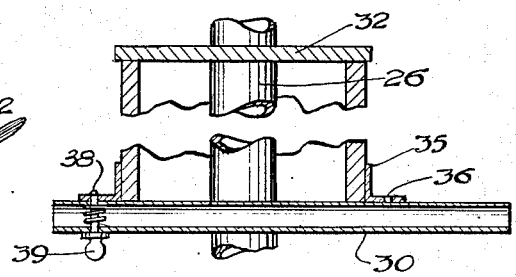
INVENTOR:
Foster M. Ford
BY Stevens & Batcheler
Attorneys.

United States Patent Office 2,695,790
Patented Nov. 30, 1954

2,695,790

VERTICAL ADJUSTING MEANS FOR MOWING MACHINES

Foster M. Ford, Morris, Ill.

Application December 15, 1952, Serial No. 325,918

8 Claims. (Cl. 280—44)

My invention relates to mowing machines of the handcart type, and more particularly to a machine designed on the order of the one patented by me on April 18, 1950, under No. 2,504,259. The patented machine is constructed with large traction wheels as rear supports and small wheels as frontal supports; and the framework is adjustable vertically in relation to the rear wheels. The present invention deals with an improvement in the vertical adjusting means of the framework, and one object of the improvement is to provide a device which is quickly handled and operated in order to procure such vertical adjustment.

A further object is to provide an adjusting device which requires no bolts or nuts to tighten or otherwise attend to, or the use of tools of any kind.

A still further object is to construct the adjusting means in a manner to be self-locking in either of two positions.

Another object is to provide a connection between the push handle of the vehicle and the rear wheel axle in a manner to procure the vertical adjustment by reversing movements between the frontal element of the push handle and the axle.

An additional object is to provide a large and rigid bearing for the adjusting means through the agency of a tubular housing carried by the framework of the machine.

With the above objects in view, a better understanding of the invention may be had by reference to the accompanying drawing, in which—

Fig. 1 is a longitudinal section of the mowing machine, showing the improved adjusting means;

Fig. 2 is a section on the line 2—2 of Fig. 1;

Fig. 3 is a perspective view of the adjusting means as viewed from the left-hand side of Fig. 2, showing the framework of the machine situated at a low level;

Fig. 4 is a similar view showing the adjusting means reversed to situate the framework of the machine at a high level; and Fig. 5 is a magnified section on the line 5—5 of Fig. 3.

In accordance with the foregoing, specific reference to the drawing indicates the frame base of the machine at 10, the power plant at 11, the forwardly extending support tube at 12, the cutter bearing at 13, and the fork branches leading forwardly from the push handle (not shown) at 14. The immediate purpose of the invention is to raise or lower the frame base 10, in order that the frontal cutter may be set low for grass or high for weeds or brush.

The element employed in connection with the frame base 10 to receive the raising and lowering movements is a tubular housing 15 which extends crosswise between the rear wheels 17 and is welded at the top to the frame base 10 in order to make a rigid connection therewith. Figs. 1, 2 and 3 show that the axle 20 of the rear wheels 17 is carried in a tube 21, and that the latter extends inside the top of the tubular housing 15. A rod 25 below the tube 21 is also carried in a tube 26 which extends inside the bottom of the tubular housing 15. The rod 25 receives the forward ends of the fork branches 14, cotter pins 27 being provided as retainers for the same.

As just described, the tubes 21 and 26 are alined vertically; and near one of their ends is situated a tubular lever 30. As seen in Fig. 3, the rear portion of this lever passes between the tubes 21 and 26 and across one end of the tubular housing 15; and the lever is welded to the tubes 21 and 26 in order to form a rigid assembly therewith. The opposite end portions of the tubes 21 and 26 have a cross-bar 32 welded to them over the other end of the tubular housing 15. The lever 30 and the bar 32 thus lock the tubes 21 and 26 from longitudinal motion relative to the tubular housing.

With the tubes 21 and 26 and the lever 30 situated as shown in Fig. 3, the cylindrical form of the tubular housing 15 makes it feasible to rotate the assembly of the tubes by swinging the lever 30 in the direction indicated by the curved arrow in Fig. 3. When this is done to the extent of a half turn, the assembly assumes the position shown in Fig. 4, that is, with the tube 21 at the bottom and the tube 26 at the top. Thus, with the axle 20 considered as stationary, the frame base 10 occupies a given height according to Fig. 3. However, with the foregoing assembly being rotated in the manner described, the tubular housing 15 is gradually lifted whereby to elevate the frame base 10 to the position shown in Fig. 4. It is thus apparent that the downswing of the lever 30 in a rearward direction procures the raising of the frame base, while the return swing of the lever accomplishes the lowering of the same.

A pair of angle lugs 35 is welded to the front and rear sides of the tubular housing next to the lever, the free wings of the lugs having perforations 36. The lever 30 carries a spring pin 38 near its rear end, as seen in Fig. 3, and such spring pin is shown engaged—as seen in Fig. 5—with the rear angle lug 35 by way of its perforation 36. This connection locks the lever against swinging motion and maintains the position of the tube and lever assembly in fixed relation to the tubular housing 15. Thus, the frame base is locked in its low position. However, when the frame base is to be raised by the first-described operation of the lever 30, the spring pin 38 is withdrawn by means of its finger knob 39 in order to release the lever 30. Then, when the latter completes its swing, the latch pin 38 engages the other angle lug 35 and snaps into the corresponding perforation 36, locking the frame base in the elevated position.

It is now apparent that the rear wheel axle 20 is primarily employed as a frame support about which to revolve the fork connecting rod 25, so that such rod and its tube 26 will operate to lift the tubular housing 15, or allow it to be lowered on the return travel of the fork rod. First, the construction of the tube assembly 21, 26 furnishes a complete transverse support for the tubular housing 15, whereby to maintain the balance of the frame base 10 between the wheels 17. Further, the lever 30 offers a power advantage for the rotation of the tube assembly without the necessity of gears, linkages or other intermediary means. Further, the connection of the spring pin 38 and the angle lugs 35 insures the positive locking of the rotary assembly at either end of its movement, so that no change in, or accidental release of, either adjustment can occur after the lever has once been set in the corresponding position. Finally, it is apparent that the novel adjusting means has no bolts or nuts to fasten or become loosened, that no tools of any kind are required to operate the adjusting means, and that the same is of very simple construction.

While I have described the invention along specific lines, various minor changes or refinements may be made therein without departing from its principle, and I reserve the right to employ all such changes and refinements as may come within the scope and spirit of the appended claims.

I claim:

1. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, and a transverse cylindrical housing carried by the frame and resting with its top portion on the axle, the rod being disposed inside the lower portion thereof.

2. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, and a transverse cylindrical housing depending from the frame and resting with its top portion on the axle, the rod being disposed inside the lower portion thereof.

3. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, and a transverse cylindrical housing depending from the frame and resting with its top portion on the axle, the rod being disposed inside the lower portion thereof, said means for revolving the cross-member being a lever secured rigidly to the axle and rod.

4. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, a transverse cylindrical housing carried by the frame and resting with its top portion on the axle, the rod being disposed inside the lower portion thereof, said means for revolving the cross-member being a lever secured rigidly to the axle and rod, and means carried by the cylindrical housing for fixing the position of the lever at the extremes of the cross-member's revolving movement.

5. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, a transverse cylindrical housing carried by the frame and resting with its top portion on the axle, the rod being disposed inside the lower portion thereof, said means for revolving the cross-member being a lever secured rigidly to the axle and the rod in a position across one end of the cylindrical housing, perforated lugs carried by said end, and a spring pin carried by the lever and adapted to snap into the perforation of either lug to fix the position of the lever at the extremes of the cross-member's revolving movement.

6. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, a transverse cylindrical housing carried by the frame and resting with its top portion on the axle, the rod being disposed inside the lower portion thereof, said means for revolving the cross-member being a lever secured rigidly to the axle and the rod in a position across one end of the cylindrical housing, angle lugs with perforated free wings carried by said end, and a spring pin carried by the lever and adapted to snap into the perforation of either wing to fix the position of the lever at the extremes of the cross-member's revolving movement.

7. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, a transverse cylindrical housing carried by the frame and resting with its top portion on the axle, the rod being disposed inside the lower portion thereof, said means for revolving the cross-member being a lever secured rigidly to the axle and the rod in a position across one end of the cylindrical housing, perforated lugs carried by said end, and a spring pin carried by the lever and adapted to snap into the perforation of either lug to fix the position of the lever at the extremes of the cross-member's revolving movement, the lever forming a check in relation to said end against longitudinal motion of the axle and rod relative to the cylindrical housing in one direction, and a stop element carried by said axle and rod opposite the other end of the cylindrical housing to check longitudinal motion of the axle and rod in the opposite direction.

8. In a utility cart, the combination with a pair of traction wheels, an axle between them, a frame supported over the axle, and a push handle extended between the wheels with fork branches; of a mechanism to raise the frame comprising a cross-member between said branches and spaced below the axle, and means for revolving the cross-member about the axle to a position spaced above the same, lifting the frame accordingly, the cross-member being a rod parallel to the axle, a transverse cylindrical housing carried by the frame and resting with its top portion on the axle, the rod being disposed inside the lower portion thereof, said means for revolving the cross-member being a lever secured rigidly to the axis and the rod in a position across one end of the cylindrical housing, perforated lugs carried by said end, and a spring pin carried by the lever and adapted to snap into the perforation of either lug to fix the position of the lever at the extremes of the cross-member's revolving movement, the lever forming a check in relation to said end against longitudinal motion of the axle and rod relative to the cylindrical housing in one direction, and a cross-bar carried by said axle and rod over the other end of the cylindrical housing to check longitudinal motion of the axle and rod in the opposite direction.

References Cited in the file of this patent

UNITED STATES PATENTS

| Number | Name | Date |
|---|---|---|
| 98,001 | Wheat et al. | Dec. 14, 1869 |
| 316,981 | Krueger | May 5, 1885 |